United States Patent [19]

Less

[11] 4,455,222
[45] Jun. 19, 1984

[54] FLUX RECOVERY DEVICE

[76] Inventor: Thomas M. Less, 7 Blake St., Westboro, Mass. 01581

[21] Appl. No.: 416,158

[22] Filed: Sep. 9, 1982

Related U.S. Application Data

[63] Continuation-in-part of Ser. No. 368,576, Apr. 15, 1982.

[51] Int. Cl.³ .................... B07B 13/16; B01D 50/00
[52] U.S. Cl. ..................................... 209/12; 209/143; 209/250; 209/258; 209/259; 55/300; 55/301; 55/320; 55/418; 55/433
[58] Field of Search ............... 209/12, 21, 30, 31, 209/143, 250, 255, 256, 258, 259; 55/320, 321, 324, 328, 432, 433, 458, 459 C, 472, 480, 493, 300, 301, 96, 418, 465; 137/244

[56] References Cited

U.S. PATENT DOCUMENTS

| | | | |
|---|---|---|---|
| 122,309 | 1/1872 | Dugan | 209/250 |
| 297,758 | 4/1884 | Case | 209/250 |
| 1,327,700 | 1/1920 | Carson | 209/255 |
| 1,661,299 | 3/1928 | Peron | 209/250 |
| 1,953,058 | 4/1934 | Andrews et al. | 209/143 |
| 2,001,271 | 5/1935 | Smith | 137/244 |
| 3,048,959 | 8/1962 | Lowther | 55/320 |
| 3,273,943 | 9/1966 | Russell | 55/472 |
| 3,421,666 | 1/1969 | Lawson | 55/432 |
| 3,618,297 | 11/1971 | Hamrick | 55/DIG. 3 |
| 3,636,683 | 1/1972 | Francis et al. | 55/493 |
| 3,820,310 | 6/1974 | Fromknecht et al. | 55/459 C |
| 3,926,788 | 12/1975 | Stephens et al. | 209/250 |
| 4,020,783 | 5/1977 | Anderson et al. | 55/337 |
| 4,025,325 | 5/1977 | Goodwin, Jr. | 55/472 |

Primary Examiner—David L. Lacey
Attorney, Agent, or Firm—Thompson, Birch, Gauthier & Samuels

[57] ABSTRACT

An improved arc-welding flux recovery device which is compact, contamination-free, and can be economically maintained.

4 Claims, 11 Drawing Figures

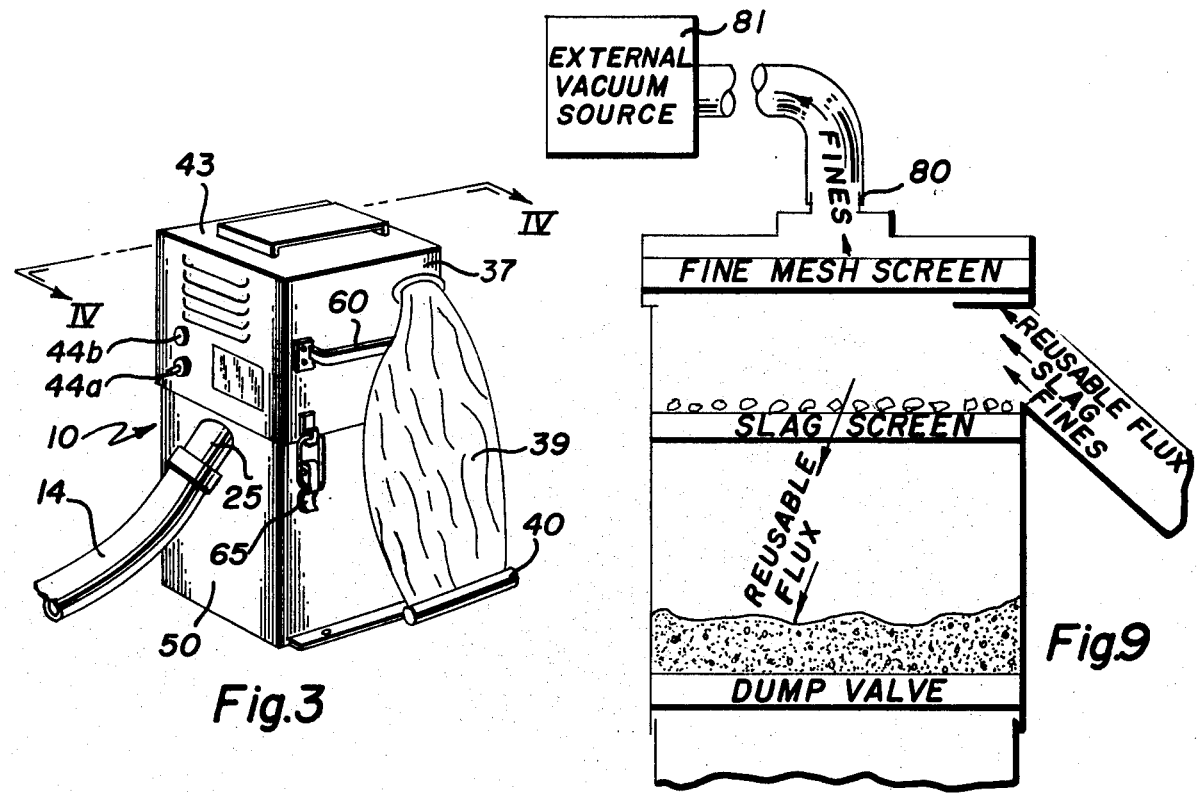
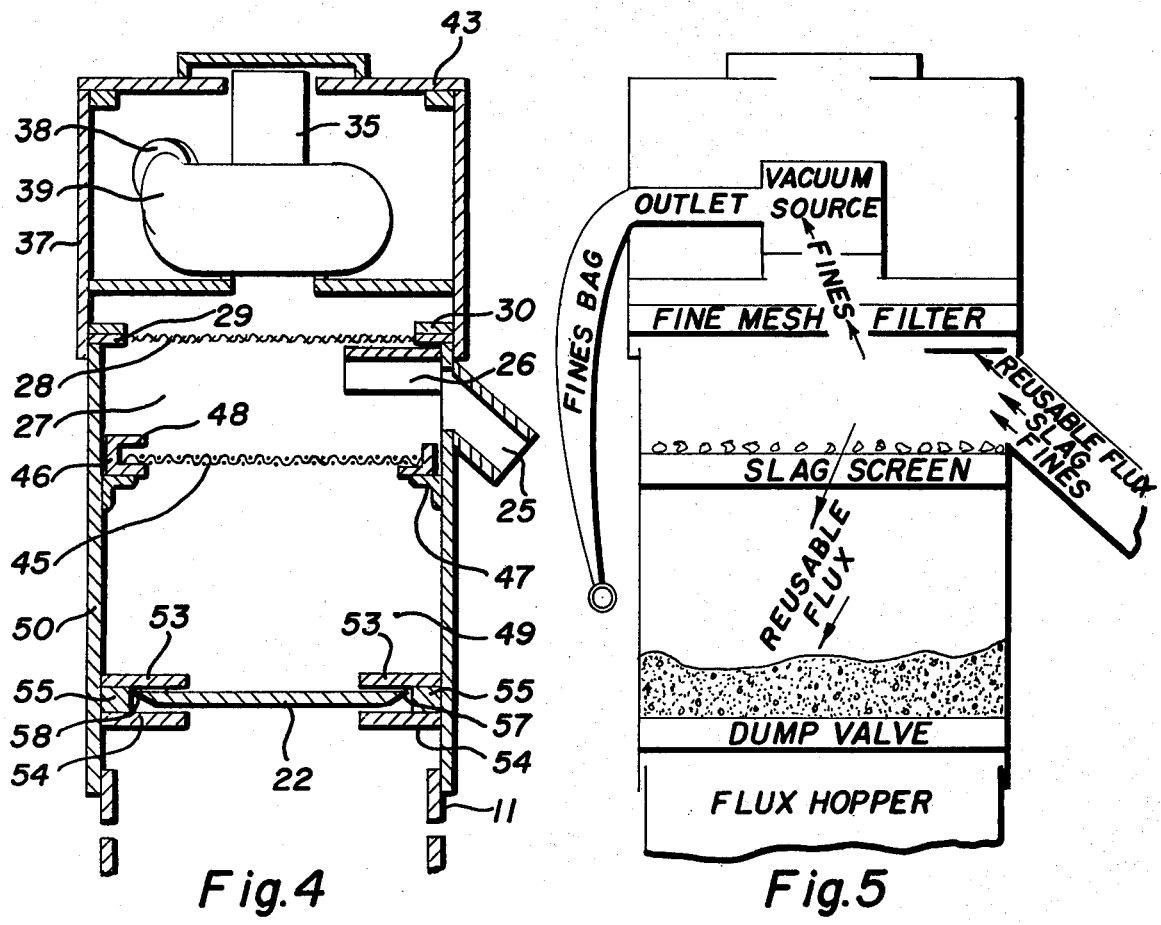

FLUX RECOVERY DEVICE

REFERENCE TO RELATED APPLICATIONS

This is a continuation-in-part of U.S. application Ser. No. 368,576 filed on Apr. 15, 1982.

BACKGROUND OF THE INVENTION

In the art of welding, flux may be employed to protect the welding pool from the deleterious effects of atmosphere on molten metals. Fluxes also may be fabricated which clean the weld metal, modify its chemical composition, and influence the shape of the weld metal area. In addition, welding fluxes are available that contain specific amounts of alloy ingredients that transfer to the weld deposit. The cost and availability of a specific composition of flux can thus become a significant economic factor in this art.

This is especially true in submerged-arc welding, which involves creating the arc and fusing the metals under a thick blanket of flux. The tip of the electrode and the welding zone are surrounded by an envelope of molten flux above which remains a layer of unfused flux in a granular state. The flux must be generally piled in order to completely submerge the welding zone. Otherwise, flashing and spattering may occur, and the weld may develop a poor appearance or become porous. It is certainly economically desirable to recover as much unfused flux as possible after the pass of the weld. This reclaimed flux can contain slag, and small-mesh particles called fines. Both slag and fines should be removed from the flux before reuse. In the past, slag has been removed by hand-screening. It is now a goal in the art to develop a capacity to automatically prepare recovered flux for reuse, at a rate which will keep up with modern automated arc-welding equipment and which is compatible with modern automatic welding heads and flux hoppers. Attempts to accomplish this have met with obstacles. Such recycling devices can be bulky, heavy, and unwieldy. When the shop air systems are used to create suction, there is a tendency for moisture and oil to contaminate the reclaimed flux, causing weld porosity and cold-cracking in alloy steel weldments. Fines filters quickly become clogged and must be regularly replaced, incurring expense. Damage can arise from very hot, or very abrasive materials entering the recycling system. Valves and doors are hindered in their action by clumps of hard and abrasive flux granules.

These and other difficulties experienced with the prior art devices have been obviated in a novel manner by the present invention.

It is, therefore, an outstanding object of the invention to provide a device which automatically separates slag and fines from recovered flux.

Another important object of the present invention is the provision of a flux recycling device incorporating self cleaning means for preventing filters from becoming clogged with fines during the recovery operation.

Another object of this invention is the provision of a flux recycling device which is light and compact.

It is another object of the instant invention to provide a flux recycling device which does not contaminate reusable flux with moisture and oil.

A still further object of the invention is the provision of a flux recycling device which is less susceptible to damage and malfunction from hot, hard, abrasive materials than the prior art devices.

It is a further object of the invention to provide a flux recycling device which minimizes the expense of filter maintenance.

It is a still further object of the present invention to provide a flux recycling device which is simple in construction and inexpensive to manufacture.

Another object of the invention is the provision of a flux recycling device which uses energy efficiently and economically.

Another object of the invention is the provision of a flux recycling device which is compatible with modern automatic arc-welding equipment.

Another object of the present invention is the provision of a flux recycling device which can be adapted for use with hand-held welding equipment.

With these and other objects in view, as will be apparent to those skilled in the art, the invention resides in the combination of parts set forth in the specification and covered by the claims appended hereto.

SUMMARY OF THE INVENTION

In general, the invention consists of a compact and integrated flux recovery device, provided with a vacuum source; a permanent, self-cleaning, inverted filter for removing fines; provision for slag removal; and a specially designed non-jamming dump valve.

BRIEF DESCRIPTION OF THE DRAWINGS

Preferred embodiments of the invention are illustrated by the accompanying drawings, in which:

FIG. 3 is a perspective view of this device in a closed state.

FIG. 4 is a sectional view of the device, taken on the line IV—IV of FIG. 3.

FIG. 5 is a schematic diagram of the device in use.

FIG. 9 is a schematic view of a modification of the device.

DESCRIPTION OF THE PREFERED EMBODIMENT

Figure 1:
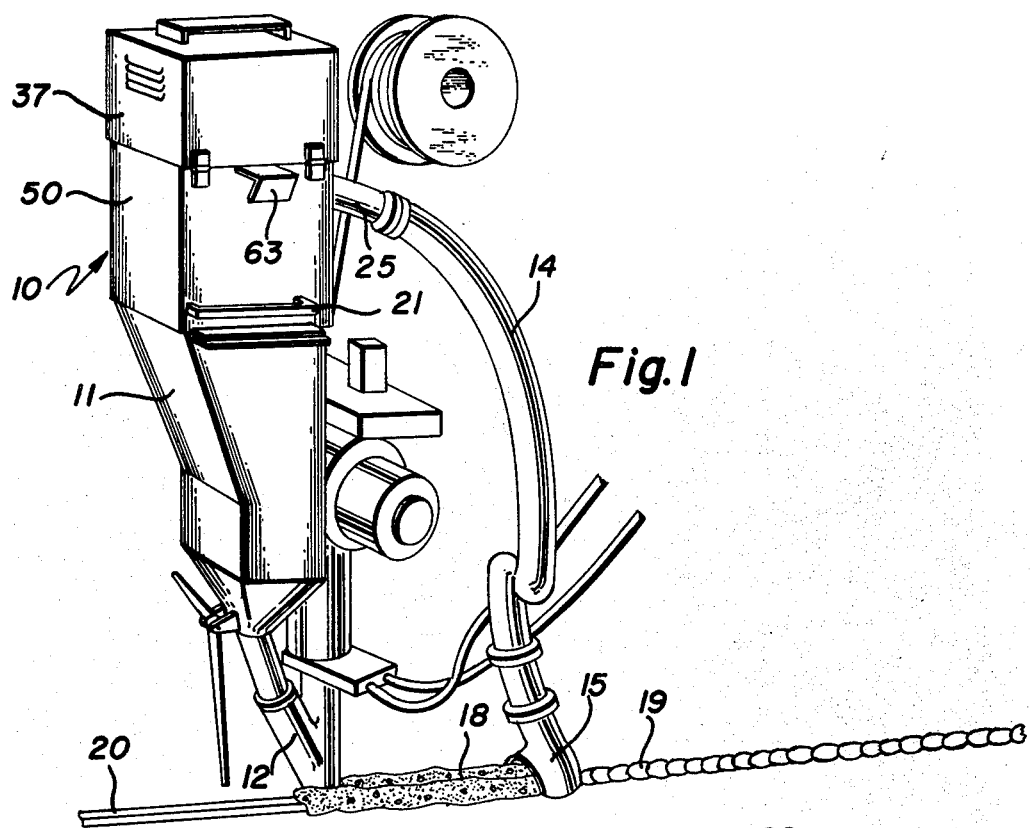
FIG. 1 is a view of a flux recovery device embodying the principles of the present invention, mounted on the hopper of a conventional arc-welding head.

FIG. 1 shows an apparatus for automatic welding of a seam by the submerged-arc welding technique. The apparatus consists mainly of an arc-welding head 12 with its flux hopper 11, and mounted on the flux hopper, a device for recovering and processing unfused flux from the operation, the device indicated generally by the numeral 10. A pick-up hose 14, formed of a high-heat and-abrasion resistent material, is clamped to an inlet nozzle 25 on the device. The other end of the pick-up hose is clamped to a pick-up foot 15. In the course of the operation of submerged-arc welding, a heavy blanket of flux is spread on the unwelded seam.

In the case illustrated in FIG. 1, flux from the hopper 11 flows out onto the unwelded metal seam 20 just in front of the progressing welding head. In the wake of the welding head is a mixture 18 consisting mainly of unfused flux, slag, and fines. At a point a sufficient distance behind to allow the weld and slag to solidify, the unfused flux is drawn up into the pick-up foot 15 through the pick-up hose 14 and into the inlet nozzle 25, leaving a clean weld 19 behind.

FIG. 3 shows the external features of an embodiment of the device 10 for processing mixture 18 for reuse. Visible are, the inlet nozzle 25 with hose 14 attached; a bottom portion, the flux box 50; a top portion, the motor box 37; with a vented and removable top 43; and a fines bag 39 with its bag clip 40. Also shown are an on/off switch 44a and a running light 44b. In a preferred embodiment, dimensions of this device are approximately: 8 inches by 9¼ inches by 19 inches.

Figure 2:
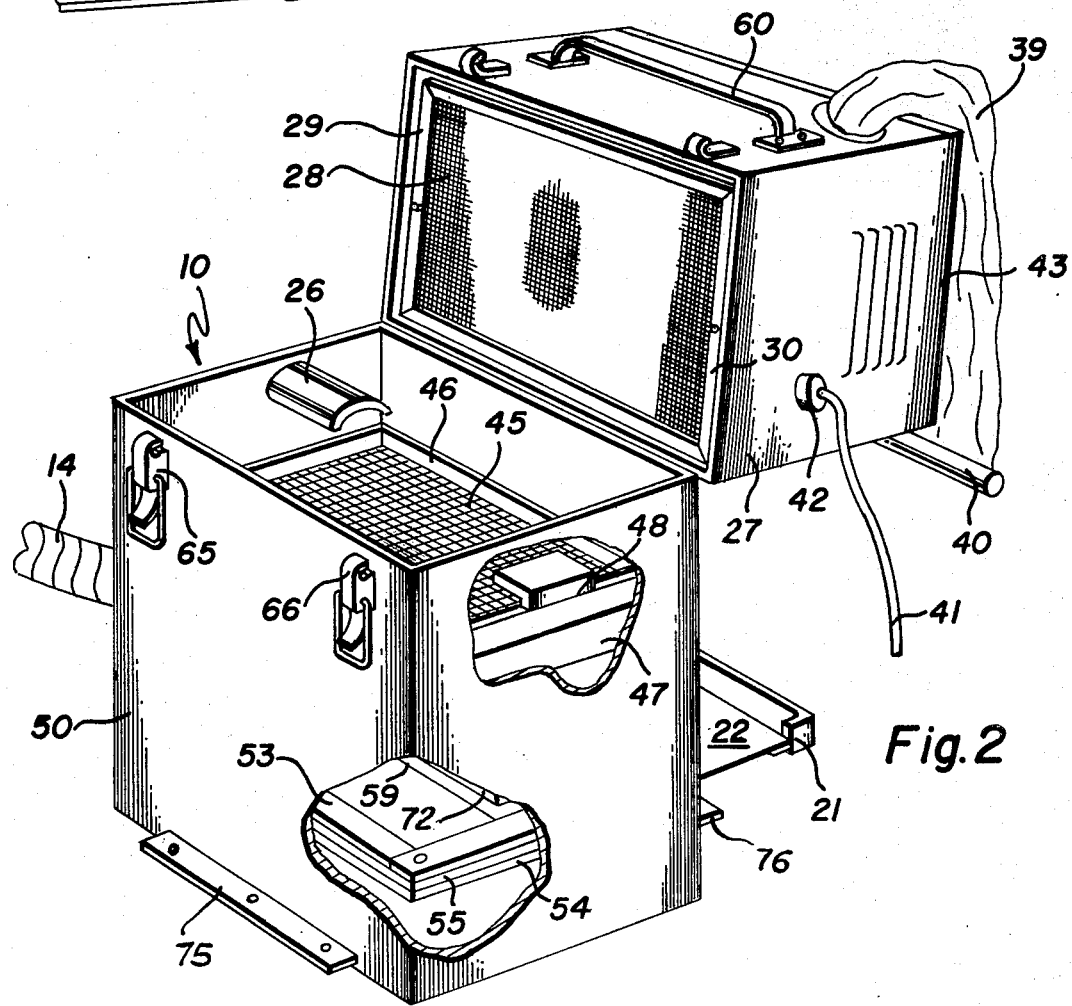
FIG. 2 is a perspective view of the device opened for screen and filter maintenance, with portions cut away.

The motor box is hinged to the flux box along one edge and clasped at the other edge, and a horizontal support 63 (best seen in FIG. 1) provided, so that the device may be opened, as illustrated in FIG. 2, and the inner parts made easily accessible. Referring also to FIG. 2, separating the inside of the motor box from the inside of the flux box is a fine-mesh filter 28 mounted in a frame 29 which is removably attached to a peripheral support 30 on the inside of the motor box. The motor box is provided with an opening for the entrance of an electric cord 41 attached by a strain relief clamp 42.

The flux box 50 is divided transversely, below the inlet nozzle, by a slag screen 45 removably mounted in a rectangular frame 46, which fits closely in the flux box. The frame is provided with a handle 48. The slag screen frame rests on, but is not attached to, a peripheral support 47 which is secured to the walls of the flux box. In this embodiment, the support is formed of angle irons which are welded to the walls of the flux box and which are best seen in FIG. 4.

Also referring to FIG. 4, beneath the slag screen is a lower chamber 49.

Figure 6:
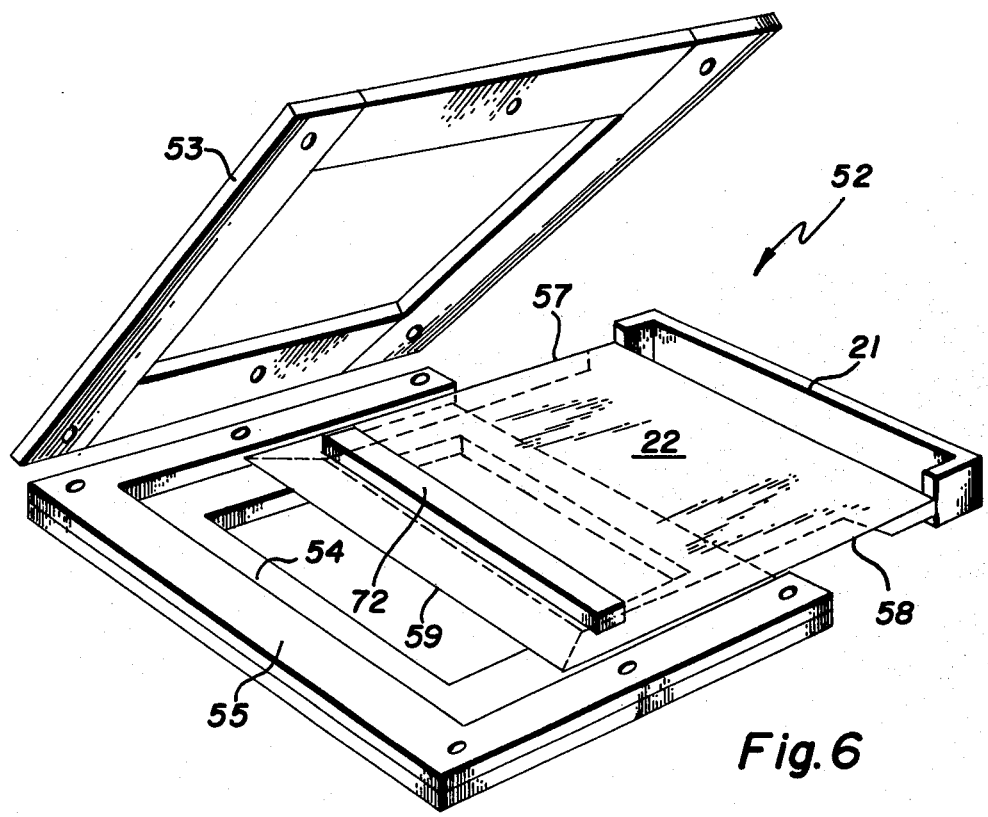
FIG. 6 is a perspective view of the sliding blade dump valve, partially exploded.

This lower chamber is bounded below by a sliding blade dump valve 52, whose construction is best seen in FIG. 6, consisting mainly of a blade 22, an upper peripheral support 53, and a lower peripheral support 54. The upper and lower supports are separated by a spacer 55, slightly less wide than the supports, open on one side, and so constructed that, with the supports, it provides a loosely-fitting guide for the blade 22. In the preferred embodiment, the upper peripheral support is welded to the walls of the flux box, and the lower peripheral support and spacer are removably attached to the upper support, using screws, bolts, or the like. The blade 22 is provided with a handle 21 at one end. The opposite end 59, and the two sides 57 and 58, of the blade may be beveled as shown in FIG. 6.

Figure 7:
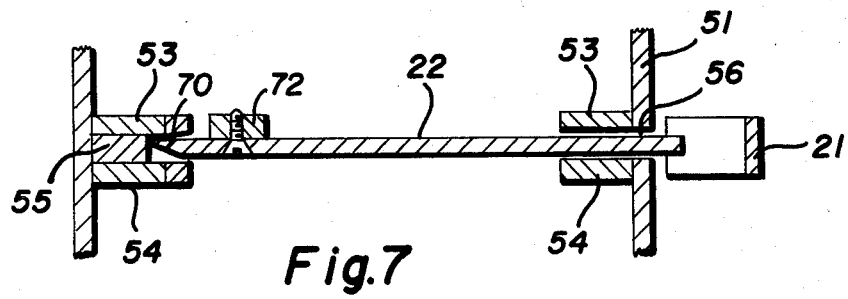
FIG. 7 is a sectional view of the sliding blade dump valve, showing the valve in a closed position.
Figure 8:
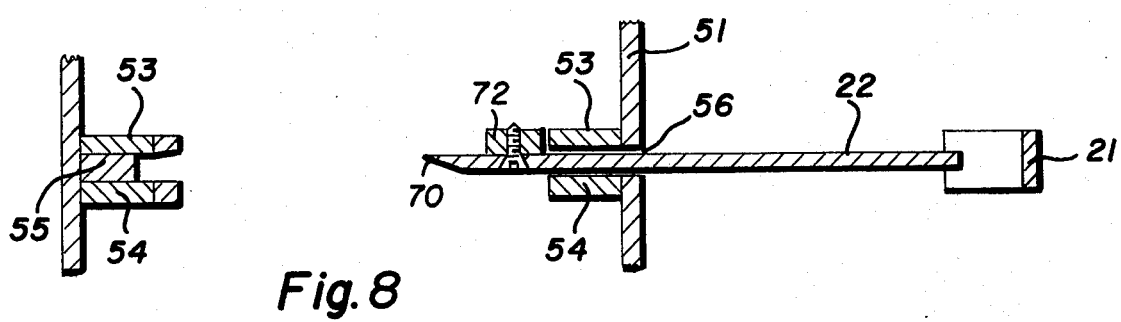
FIG. 8 shows the valve in an open position.

As FIGS. 7 and 8 show, a slot 56 is provided through one wall 51 of the flux box 50. The blade 22 extends through this slot and the handle 21 is attached to the protruding edge. Means are provided for stopping the blade from being drawn completely through the slot. In this construction, the means consist of a bar 72 attached parallel and close to the edge 70.

The sectional view in FIG. 4, along with the analogous schematic view of FIG. 5, most clearly illustrates the operation and novel aspects of the flux recovery device. The processing of materials is powered by suction from a vacuum source 35. In this embodiment, a compact, high-powered electrical pump is used, preferably of the tangential discharge type, as illustrated. Such a pump produces two to three times the vacuum power of a typical shop-air vacuum source, without the difficulties associated with oil and/or moisture contamination. The suction so produced draws materials (by means of the previously described pick-up hose) through the inlet nozzle, and obliquely into an upper chamber 27 in the flux box 50. The flow of materials is deflected horizontally by a baffle 26, in this case of semi-circular cross-section. This baffle has the dual effect of protecting the fines filter 28 from direct abrasion from the stream of flux while providing turbulence for optimum separation of the components. The fines filter 28 is constructed to allow undesirable fines to pass through to be exhausted through the outlet 38. The use of a fine-mesh metal cloth as the filter has been found to best accomplish the desired object. The optimum material for this use is stainless-steel, being (easy to clean), non-corroding, non-flammable, and abrasion-resistant. The mesh of the filter is to be such as to allow through undesirable fines, and retain reusable-sized granules of flux. A mesh of 60 or smaller is desirable as this mesh minimizes the erosion of pump parts due to abrasive fines of larger mesh, yet removes most of the undesirable fines from the used flux.

After leaving the pump outlet 38, the fines may be collected in an air-permeable fines bag 39.

The recovered flux with fines removed falls from the upper chamber 27 through the slag screen 45 into the lower chamber 49. The slag screen is of a mesh to prevent fragments of slag greater than a maximum size from passing through. This maximum will depend on the welding specification of the job. The slag screen proper may be removed from its frame and replaced to meet changing requirements. Alternatively, a range of meshes in separate frames may be provided for more convenient adjustment.

The flux remaining after this treatment, purged of fines and slag, collects in the lower chamber 49. When it is desired to return the recovered flux to the hopper 11 of the welding head, the operator opens the dump valve 52 and allows the accumulated flux to fall into the hopper. Thus, the need is eliminated for transferring flux from the storage area of a recovery device to the active hopper of the arc-welding head. Return of the blade to closed position is facilitated by the design of the blade and supports. The blade is guided loosely enough in its supports so that flux granules, rather than causing jamming, form a lubricating layer between blade and supports. This action is further potentiated by the beveled undersides of the three edges 57, 58 and 59 of the blade, which encourage the blade to ride up and cut through interposed flux.

To prevent suction from the recovery device from interfering with the flow of flux from the hopper to the weld, openings may be provided in the hopper walls to break any suction leakage.

The maintenance which is required of all flux recovery systems is uniquely simple in the case of this device. As shown in FIG. 2, the clasps 65 and 66 may be unfastened, the handle 60 lifted and the motor box tilted back onto its support 63 (which is more visible in FIG. 1). The slag screen 45 is removed for emptying by grasping it by the handle 48 on its frame 46, and lifting the frame up and out of the flux box. The maintenance of the fine-mesh filter is performed in situ by cleaning with a dry, soft-bristle brush. Removal of dust and lint ensures maximum vacuum. Maintenance of the electric vacuum pump is facilitated by removal of the vented motor box top 43. The fines bag is provided with a bag clip 40 and may be emptied simply by unclipping it and shaking the accumulated fines out.

A modification of the device as shown schematically in FIG. 9 provides a fitting 80 to allow external vacuum producing equipment 81 to be used as the vacuum source.

Figure 10:
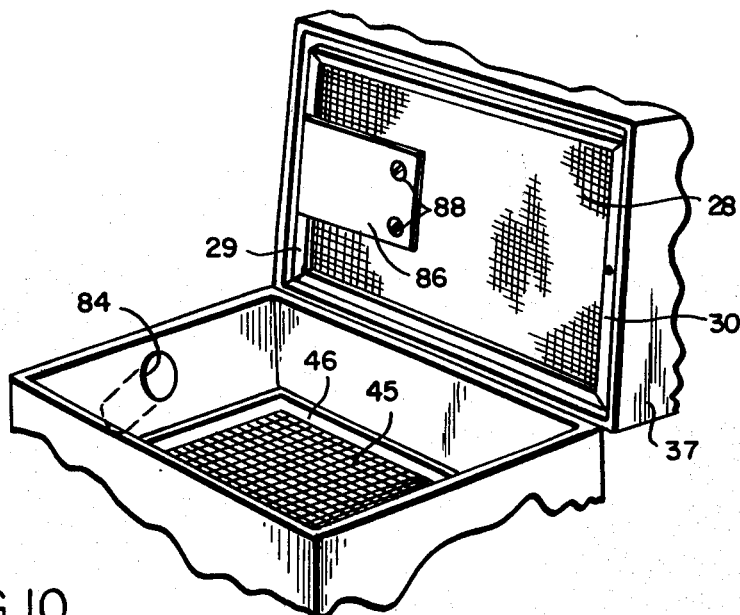
FIG. 10 is a partial perspective view of a second modification of the device.
Figure 11:
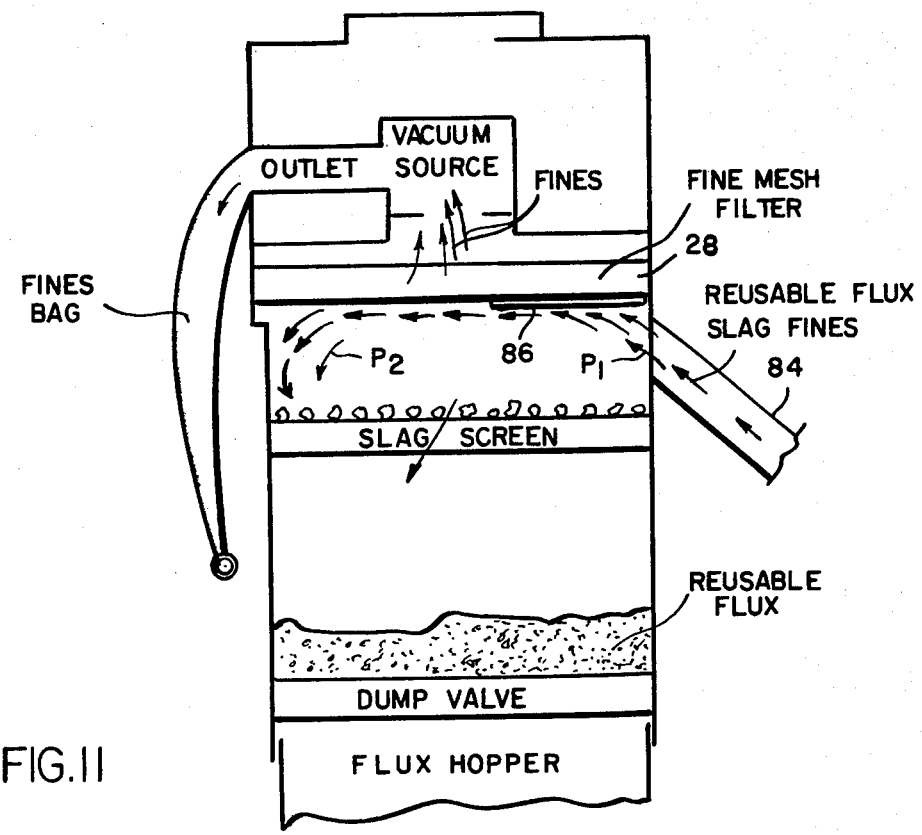
FIG. 11 is a schematic view of the modification shown in FIG. 10.

Referring now to FIGS. 10 and 11, another embodiment of the device is shown, wherein the baffle 26 of FIG. 2 has been removed, leaving an inclined outlet 84 arranged to discharge the mixture of slag, fines and unfused flux upwardly along a path schematically depicted by arrow $P_1$ towards the fine filter 28. An impingement plate 86 is removably secured to the filter 28 by any convenient means, for example small screws 88 or the like. The plate 86, which typically comprises 16 gauge steel sheet, is positioned in the path $P_1$, thus deflecting the particles being discharged from outlet 84 along a path $P_2$ across and somewhat parallel to the lower face of the filter. In this manner, at least some of the deflected particles collide with and dislodge other particles temporarily caught in the screen interstices, thus providing a continuous self-cleaning action for the screen 28. Experience has indicated that the best self-cleaning results are obtained when the fine filter 28 consists of a 200 mesh screen.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having thus been described, what is claimed as new and desired to secure by Letters Patent is:

1. Apparatus for separating slag and fines from reusable flux recovered during submerged-arc welding, comprising: a container; a wire screen horizontally subdividing said container into upper and lower chambers; a planar filter in said upper chamber, said filter being spaced vertically above said screen; an inlet communicating with said chamber between said filter and said screen; a vacuum source communicating with said upper chamber above said filter, said vacuum source being adapted to draw a mixture of reusable flux, slag, and fines into said upper chamber via said inlet, said inlet being arranged to direct said mixture towards said filter along a first path which is oblique with respect to said filter; and a planar impingement plate underlying a portion of said filter, said impingement plate lying in said first path and being arranged to deflect said mixture from said first path into a second path passing across the underside of said filter; said planar filter being constructed so as to permit fines to pass therethrough while retaining slag and reusable flux therebeneath in said upper chamber, and said screen being constructed so as to retain slag in said upper chamber while permitting reusable flux to pass therethrough into said lower chamber.

2. The apparatus of claim 1 wherein said filter comprises a sheet of 200 mesh stainless steel cloth.

3. The apparatus of claim 1 wherein said impingement plate is secured to and in substantial coplanar relationship with the underside of said filter.

4. The apparatus of claim 3 wherein said impingement plate is removably secured to said filter.

* * * * *